US012018514B2

(12) United States Patent
Alvarez

(10) Patent No.: US 12,018,514 B2
(45) Date of Patent: Jun. 25, 2024

(54) REVERSIBLE DOOR LOCK WITH STATUS INDICATOR

(71) Applicant: ASSA ABLOY Access and Egress Hardware Group, Inc., New Haven, CT (US)

(72) Inventor: Daniel Alvarez, New Haven, CT (US)

(73) Assignee: ASSA ABLOY Access and Egress Hardware Group, Inc., New Haven, CT (US)

(*) Notice: Subject to any disclaimer, the term of this patent is extended or adjusted under 35 U.S.C. 154(b) by 267 days.

(21) Appl. No.: 17/359,929

(22) Filed: Jun. 28, 2021

(65) Prior Publication Data

US 2022/0098898 A1 Mar. 31, 2022

Related U.S. Application Data

(60) Provisional application No. 63/085,989, filed on Sep. 30, 2020.

(51) Int. Cl.

| | |
|---|---|
| ***E05B 41/00*** | (2006.01) |
| ***E05B 15/02*** | (2006.01) |
| ***E05B 63/00*** | (2006.01) |
| *E05B 63/04* | (2006.01) |

(52) U.S. Cl.

CPC .............. *E05B 41/00* (2013.01); *E05B 15/02* (2013.01); *E05B 63/0017* (2013.01)

(58) Field of Classification Search

CPC ...... E05B 41/00; E05B 63/04; Y10T 70/7407; Y10T 70/8027

See application file for complete search history.

(56) References Cited

U.S. PATENT DOCUMENTS

| | | | | | |
|---|---|---|---|---|---|
| 345,339 | A * | 7/1886 | Vail | E05B 41/00 | 40/907 |
| 417,326 | A * | 12/1889 | King | E05B 41/00 | 40/907 |
| 419,607 | A * | 1/1890 | King | E05B 41/00 | 40/907 |

(Continued)

FOREIGN PATENT DOCUMENTS

| | | | |
|---|---|---|---|
| DE | 495410 | C * | 4/1930 |
| FR | 674662 | A * | 1/1930 |

(Continued)

*Primary Examiner* — Carlos Lugo

(74) *Attorney, Agent, or Firm* — Wolf, Greenfield & Sacks, P.C.

(57) ABSTRACT

A reversible door lock having a status indicator is provided. The door lock may include an escutcheon plate having a window through which the status of the door on a status indicator ring may be view. When the door is locked and unlocked via an actuator (e.g., a thumbturn) the door status indicator ring may change positions. The lock may include a drive wheel operatively coupled to the actuator and the status indicator ring. The drive wheel may be capable of moving between a first orientation and a second orientation relative to the status indicator ring such that the door lock operates in a first direction (e.g., a right-hand direction) when the drive wheel is in the first orientation and in a second direction (e.g., a left-hand direction) when the drive wheel is in the second orientation.

15 Claims, 11 Drawing Sheets

(56) References Cited

U.S. PATENT DOCUMENTS

| | | | | | |
|---|---|---|---|---|---|
| 943,637 | A * | 12/1909 | Schoell | E05B 41/00 40/907 |
| 1,066,664 | A * | 7/1913 | Senior | E05B 41/00 40/907 |
| 1,337,401 | A * | 4/1920 | Heberling | E05B 41/00 40/907 |
| 1,448,610 | A * | 3/1923 | Weinberger | E05B 41/00 40/907 |
| 2,902,784 | A * | 9/1959 | Deva | G08B 5/02 40/486 |
| 4,490,999 | A * | 1/1985 | Castle | E05B 41/00 70/330 |
| 4,854,061 | A * | 8/1989 | Khoshkish | G09F 11/04 40/907 |
| 9,845,620 | B2 * | 12/2017 | Bronner | E05B 63/0017 |
| 10,920,466 | B2 * | 2/2021 | Long | E05B 53/00 |
| 2021/0372161 | A1 * | 12/2021 | Clifford | E05B 47/0038 |

FOREIGN PATENT DOCUMENTS

| | | | |
|---|---|---|---|
| GB | 191027250 | A * | 11/1911 |
| GB | 191401823 | A * | 1/1915 |
| GB | 196345 | A * | 4/1923 |
| KR | 20140035041 | A * | 3/2014 |
| KR | 200477079 | Y1 * | 5/2015 |

* cited by examiner

REVERSIBLE DOOR LOCK WITH STATUS INDICATOR

CROSS-REFERENCE TO RELATED APPLICATIONS

This application claims the benefit under 35 U.S.C. § 119(e) of U.S. Provisional Application Ser. No. 63/085,989, titled "REVERSIBLE DOOR LOCK WITH STATUS INDICATOR," filed on Sep. 30, 2020, which is incorporated herein in its entirety.

FIELD

Disclosed embodiments relate to a reversible door lock with a status indicator, for example, a door lock with a status indicator capable of being installed in a door in either a left-hand configuration or a right-hand configuration.

BACKGROUND

Door locks (e.g., a deadbolt lock, a mortise lock, a cylindrical lock, or lock of other suitable type) are used to secure entryways and may be in an unlocked state, wherein a deadbolt and/or latch of the door lock is in a retracted or unlocked state enabling access or in a locked state, wherein the deadbolt and/or latch is in an extended or locked state such that access from one or both sides of the door is prevented. In some instances, an actuator, such as a thumbturn, on an interior side of the door may be used to transition the door lock from an unlocked state to a locked stated, or from a locked state to an unlocked state.

BRIEF SUMMARY

According to one aspect of the present disclosure, a door lock includes a locking mechanism, a lock body housing the locking mechanism, a thumbturn disposed on the lock body, an escutcheon plate disposed on the lock body, one or more indicator windows disposed through a portion of the escutcheon plate, a status indicator ring, at least a portion of which is visible through the indicator window, having a first indication denoting that the locking mechanism is in a locked position and a second indication denoting that the locking mechanism is in an unlocked position, and a drive wheel operatively coupled to the status indicator ring and the thumbturn such that the status indicator ring turns as the thumbturn turns the drive wheel. The locking mechanism may be engageable via the thumbturn to lock and unlock the locking mechanism. Further, the drive wheel may be configured to transition between a first fixed state and a second fixed state such that the locking mechanism is oriented in a first orientation in the first fixed state and the locking mechanism is oriented in a second orientation opposite the first orientation in the second fixed state.

According to another aspect of the present disclosure, a method of reversing the orientation of a door lock includes (1) applying a first force to a status indicator ring in the direction of a thumbturn, (2) applying a second force on the thumbturn in the direction of a status indicator ring, overcoming a biasing force from a spring, (3) rotating the thumbturn from a first position to a second position, and (4) removing the first and second forces.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
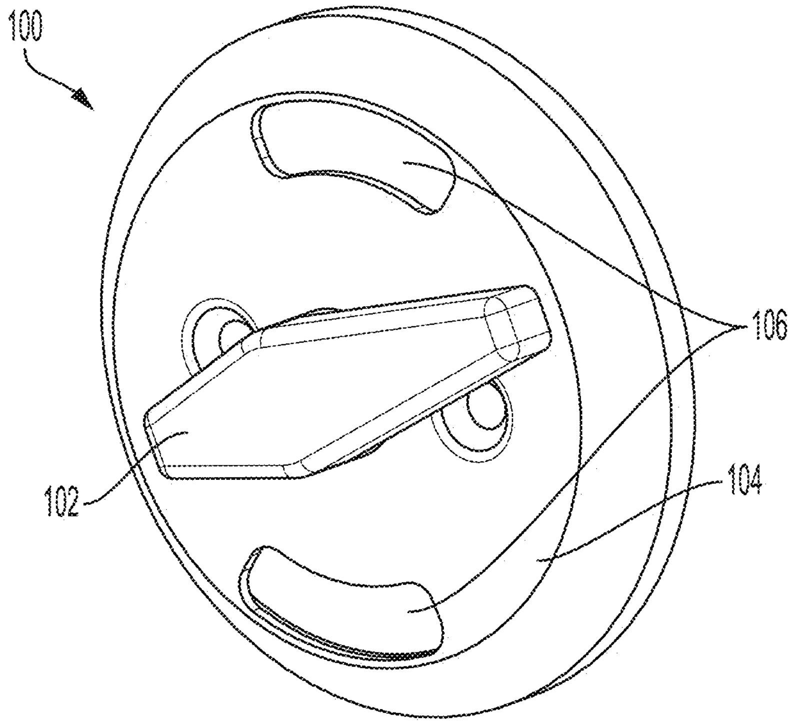
FIG. 1A is a perspective view of a reversible door lock with status indicator according to one illustrative embodiment.

Aspects described herein relate to door locks configured to indicate the lock status of the door lock, for example, to indicate whether the door lock is in an unlocked state or a locked state. The door lock may provide a visual indication of the lock status on a first side of the door (e.g., the interior of an entryway). Indicating the status of the door lock on the interior side of the door may be useful to provide a measure of comfort or reliance that the door is locked. This may be important for example in a classroom setting where the teacher desires to quickly see that that the door is locked. The door lock with status indicator may be configured such that the lock status is automatically indicated as the door lock is transitioned from the unlocked state to the locked state or from the locked state to the unlocked state. The door lock with status indicator may be mechanical in that the door lock does not require electronic power and/or signal to indicate the lock status.

Conventional door locks with status indicators may be produced to operate in a fixed manner. For example, a conventional door lock may be manufactured such that the lock operates by actuating a locking mechanism (e.g., a deadbolt lock, a mortise lock, a cylindrical lock, or lock of other suitable type) in a fixed orientation (e.g., a right-hand orientation or a left-hand orientation). Particularly, when manufacturing a door lock with a status indicator, the manufacturer may need to account for the directionality not only of a locking mechanism of a door lock but also the directionality of the status indicator mechanism of the door lock. Thus, the manufacturer may produce door locks with status indicators only capable of functioning in a single orientation. However, producing locks only capable of operating in a single orientation may result in inefficiencies, such as greater costs, excess SKU's, and/or excess waste.

In view of the above, the Inventors have recognized the advantages of a configurable door lock having a status indicator capable of being adapted for a wide range of applications. For example, a door lock according to the present disclosure may be shipped to a customer as a kit or series of parts for installation. The user may then assemble, and/or install the door lock according to a specific application. For example, in some instances, it may be desirable for a user to assemble the door lock in a first orientation (e.g., for a left-handed door) or in a second orientation (e.g., for a right-handed door). The manufacturer may produce a single SKU of door locks adapted for such different applications, rather than multiple SKU's for differing applications, reducing complexity and waste.

According to one aspect, a door lock includes a locking mechanism, a lock body, an actuator (e.g., a thumbturn), an escutcheon plate, a status indicator ring, and a drive wheel. The lock body may serve to house the locking mechanism of the door lock. Further, the actuator (e.g., thumbturn) may be disposed on the lock body and may be operatively connected to the locking mechanism such that the actuator may engage the locking mechanism (e.g., lock and/or unlock the locking mechanism). The escutcheon plate, which may be disposed on the lock body, may include one or more indicator windows so that at least a portion of the status indicator ring may be visible through the one or more indicator windows. Via the indicator windows, the status indicator ring may be capable of providing a first indication (e.g., an indication denoting that the locking mechanism is in a locked position) and a second indication (e.g., an indication denoting that the locking mechanism is in an unlocked position). In turn, the drive wheel may be operatively coupled to both the status indicator ring and the actuator. Accordingly, the drive wheel may operatively connect the actuator to the status indicator ring such that the status indicator ring turns as the actuator engages the locking mechanism (e.g., by turning), allowing the status indicator ring to transition between indications.

Moreover, the drive wheel may include features that allow the drive wheel to set the orientation of the locking mechanism. For example, the drive wheel may be capable of transitioning from a first fixed state to a second fixed state. When the drive wheel is in the first fixed state, the locking mechanism may be oriented in a first orientation (e.g., a right-hand orientation), and when the drive wheel is in the second fixed state, the locking mechanism may be oriented in a second orientation (e.g., a left-hand orientation). In some instances, the second orientation may be an orientation opposite to the first orientation, though the disclosure is not so limited.

In some instances, the actuator may serve to transition the drive wheel from the first fixed orientation to the second fixed orientation. For example, the actuator may include a spring, while may bias the actuator away from the lock body. However, a user may overcome the bias (e.g., by applying a force by hand on the actuator towards the status indicator ring), decoupling the drive wheel from the status indicator ring. In such a position, the user may then move (e.g., turn) the actuator to transition the drive wheel from the first fixed state to the second fixed state.

In some instances, the lock may include a display body operatively coupled to the lock body. The display body may serve to display an indication of the status of the locking mechanism (e.g., locked or unlocked), either alternatively or in addition to the combination of the indicator windows and the status indicator wheel described above. Specifically, in some instances, the lock body may be configured to be positioned on a first side of a door, while the display body may be configured to be positioned on a second, opposite side of the door.

The lock body may be operatively connected to the display body via a connecting rod. In turn the connecting rod may be operatively coupled to the actuator. Thus, the actuator may be capable of manipulating the display body to display an indication corresponding to the status of the locking mechanism via the connecting rod. For example, in some instances, the display body includes an indicator wheel operatively coupled to the connecting rod such that as the actuator moves (e.g., turns), the indicator wheel turns. Thus, the indicator may be able to display an indication of the status of the locking mechanism similarly to the status indicator ring as described above.

In view of the reversibility feature of the locking mechanism, the indicator wheel and the status indicator ring may be constructed to adapt to the different potential orientations of the locking mechanism. For example, the status indicator ring and the indicator wheel may be marked with indications sufficient to show the status of the lock regardless of how the actuator moves and/or the orientation of the lock.

According to another aspect, the present disclosure may be embodied as a method, for example, a method of reversing the orientation of a door lock. The method may include that a user first applying a first force to the status indicator ring in the direction of the actuator. Then, the user may apply a second force to the actuator in the direction of the status indicator ring, overcoming the biasing force of the spring described above. The user may then rotate the actuator from a first position to a second position and then release the actuator and the status indicator ring (e.g., by removing the first and second forces). Though the method steps may be executed in the order described above, this need not be the case, as the method may be executed in any suitable order.

In some instances, the above method may only be performed when the lock is disassembled or otherwise not installed on a door. For example, the lock body may include a cover shield that restricts the movement of the drive wheel when installed. Thus, the drive wheel may only transition from the first fixed state to the second fixed state when the cover shield is removed. However, this need not be the case, as the disclosure is not so limited.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
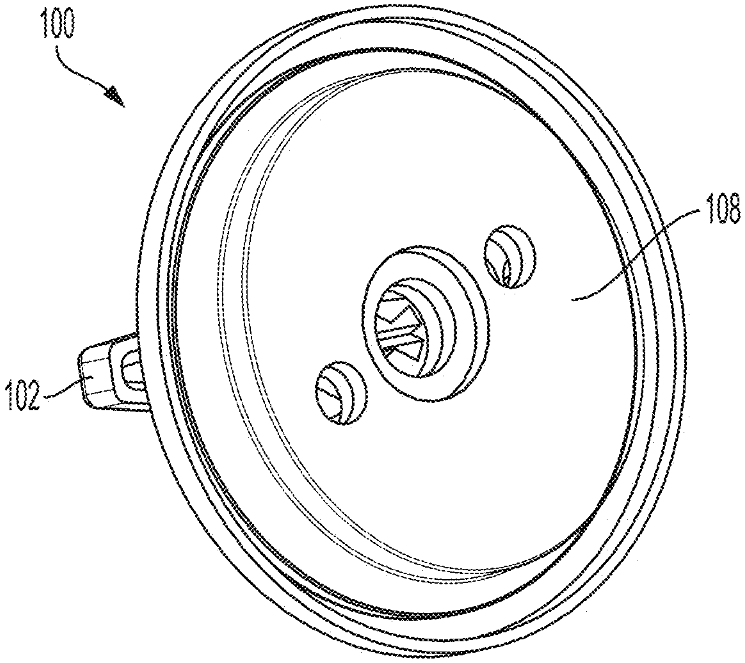
FIG. 1B is a perspective view of a reversible door lock with status indicator according to one illustrative embodiment.

FIGS. 1A-1B are front and rear perspective views of a lock body 100 according to one illustrative embodiment. In some embodiments, lock body 100 is configured to retain the functional components of a locking mechanism capable of indicating a status of the locking mechanism. For example, lock body 100 may include an escutcheon plate 104 with one or more indicator windows 106 formed in the escutcheon plate. The indicator windows 106 may allow components of the locking mechanism to display an indication of the status of the locking mechanism. Moreover, a thumbturn 102 may be operatively coupled to the components of the locking mechanism. Thus, thumbturn 102 may be able to engage (e.g., operate) the locking mechanism.

Figure 2:
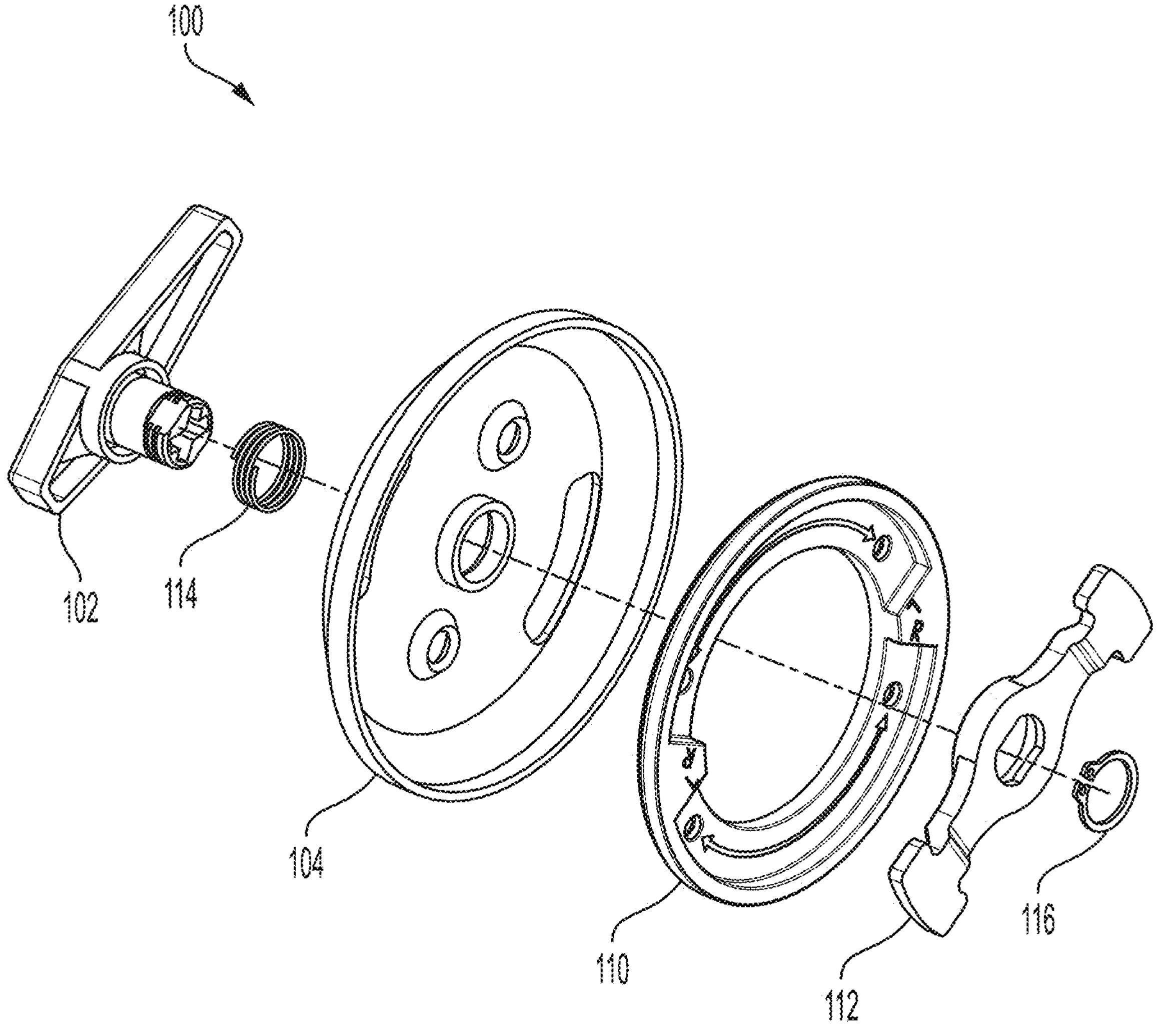
FIG. 2 is an exploded perspective view of a reversible door lock with status indicator according to one illustrative embodiment.

Additional components of the locking mechanism are shown in the exploded perspective view of FIG. 2. Specifically, the locking mechanism may include a status indicator ring 110, a drive wheel 112, a spring 114, and a snap ring 116. Status indicator ring 110 may serve to display the status of the locking mechanism. For example, a portion of status indicator ring 110 may be visible through indicator window 106, depending on the orientation of status indicator ring 110. In turn, corresponding portions of status indicator ring 110 may include one or more indications associated with one or more lock statuses. For example, status indicator ring 110 may include a first indication denoting that the locking mechanism is locked and a second indication that the locking mechanism is unlocked. The first and second indications may take on a number of forms, such as a series of colors (e.g., red for locked and green for unlocked), a series of words (e.g., "open," "unlocked," "closed," "locked," etc.), a surface texture gradient (e.g., a rough surface denoting one state as in locked and a smooth surface denoting another state as in unlocked), or any other suitable indication.

Status indicator ring 110 may be operatively coupled to drive wheel 112. Specifically, drive wheel 112 may be removably engaged with status indicator ring 110 via one or more pins. Thus, when drive wheel 112 is engaged with status indicator ring 110, status indicator ring 110 may move as drive wheel 112 moves. Further, thumbturn 102 may be operatively connected to drive wheel 112. For example, a portion of thumbturn 102 may be fixed behind drive wheel 112 via a fastener, such as a snap ring 116. Thus, thumbturn 102 may be operatively coupled to status indicator ring 110 via drive wheel 112 such that as thumbturn 102 moves, status indicator ring 110 moves. It follows that status indicator ring 110 may display a different portion of status indicator ring 110, depending on the position of thumbturn 102, thus mechanically displaying an indication of the status of the locking mechanism, as described above. Of course, the locking mechanism need not use a snap ring and a series of pins as fasteners as other suitable fasteners may be employed, depending on the application.

In some embodiments, thumbturn 102 serves to engage and disengage drive wheel 112 from status indicator ring 110. Specifically, when a door lock according to the embodiments disclosed herein is not installed on a door or is otherwise disassembled, the user may adjust the orientation (e.g., directionality) of the door lock. When a user (e.g., a customer) acquires the door lock, the user may receive the door lock as a disassembled kit including the parts described above. Additionally, lock body 100 may include a cover plate 108 (shown in FIG. 1B) to seal the functional components of the locking mechanism within lock body 100. In some instances, the user may set the orientation of door lock 200 when cover plate 108 is not installed on lock body 100. For example, thumbturn 102 may displace drive wheel 112 away from status indicator ring 110, disengaging drive wheel 112 from status indicator ring 110. Thumbturn 102 may be equipped with biasing spring 114 to bias thumbturn 102 and drive wheel 112 such that drive wheel 112 remains engaged with status indicator ring 110. Specifically, biasing spring 114 may be disposed along a portion of thumbturn 102 (e.g., along the shaft of the thumbturn) such that biasing spring 114 biases thumbturn 102 away from status indicator ring 110 (and by extension escutcheon plate 104). Thus, biasing spring 114 may bias thumbturn 102 away from status indicator ring 110 such that drive wheel 112 remains engaged with status indicator ring 110, unless a user applies a force on thumbturn 102 in the direction of status indicator ring 110. Accordingly, a user may manipulate (i.e., push) thumbturn 102 to selectively engage and disengage drive wheel 112 from status indicator ring 110.

Figure 3A:
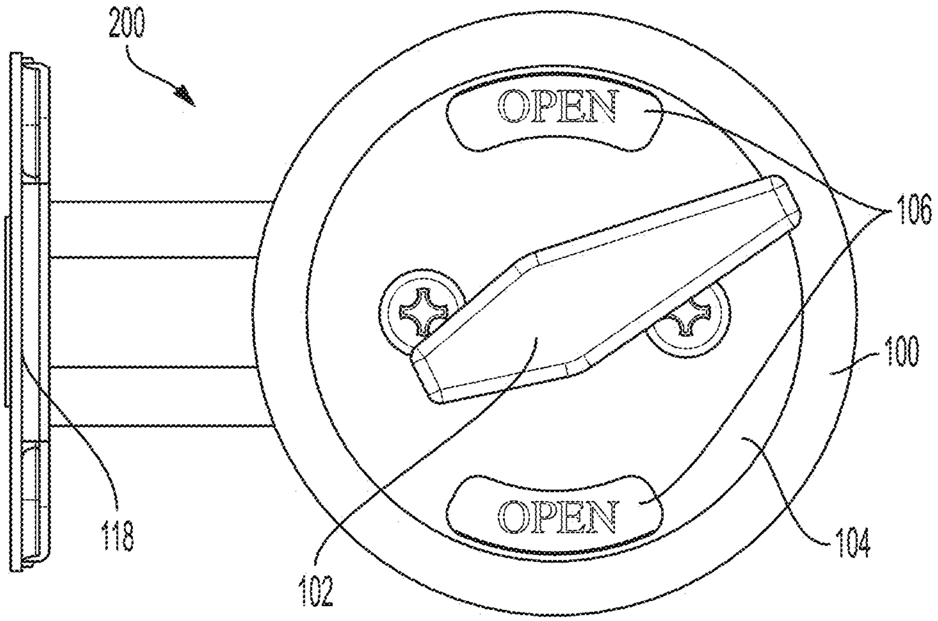
FIG. 3A is a front view of a reversible door lock with status indicator assembled with a deadbolt lock according to one illustrative embodiment.
Figure 3B:
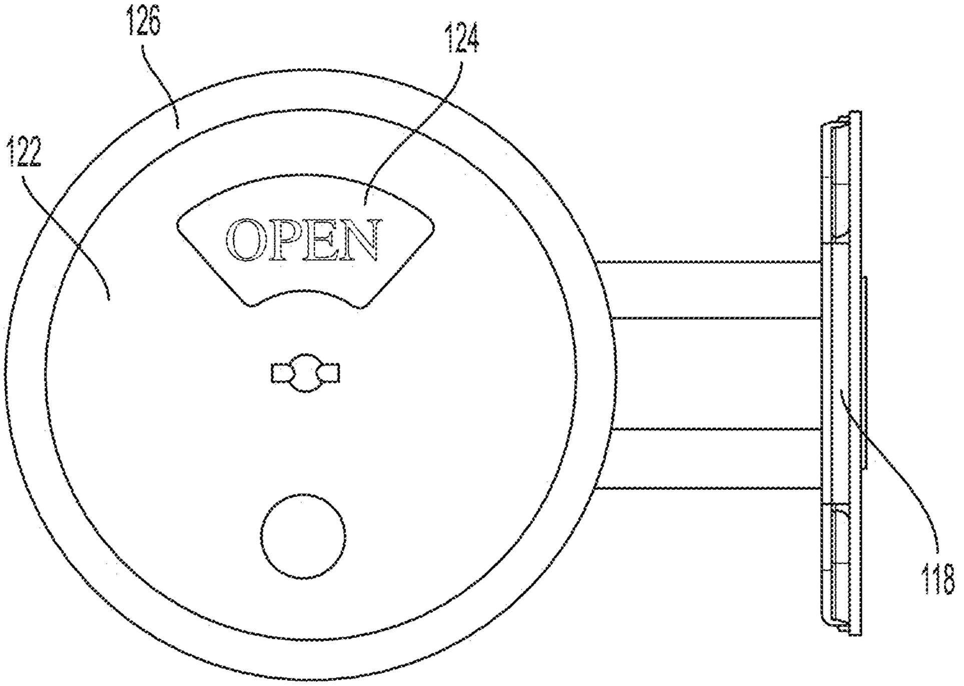
FIG. 3B is a rear view of a reversible door lock with status indicator assembled with a deadbolt lock according to one illustrative embodiment.

FIGS. 3A-3B show front and rear views respectively of a door lock 200 according to one illustrative embodiment. In some embodiments, door lock 200 includes lock body 100 (e.g., containing the components as described above), a display body 126, and a deadbolt 118. The locking mechanism of door lock 200 may serve to actuate deadbolt 118. For example, as thumbturn 102 moves from a first position to a second position, deadbolt 118 may move from an unlocked configuration to a locked configuration. Relatedly, as thumbturn 118 moved from the second position to the first position, deadbolt 118 may move from the locked configuration to unlocked configuration.

Figure 4:
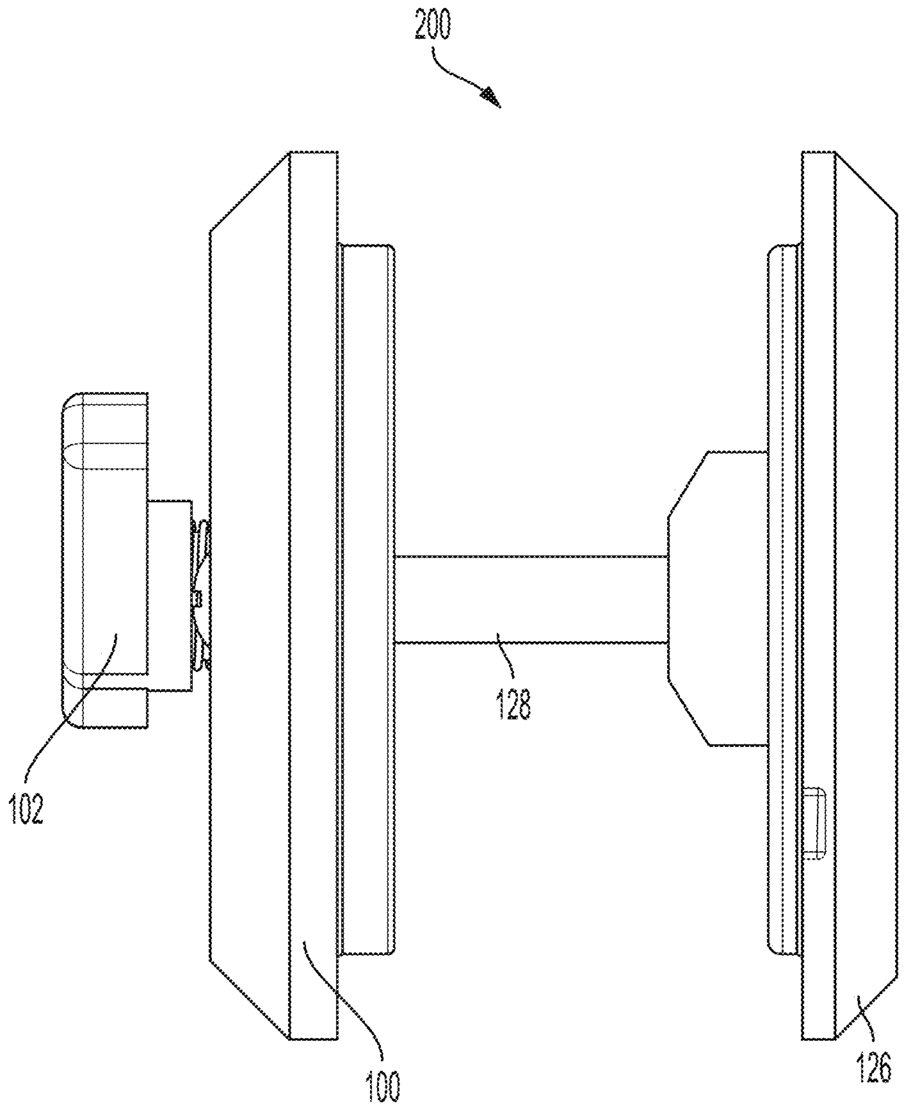
FIG. 4 is a side view of a reversible door lock with status indicator according to one illustrative embodiment.

Moreover, display body 126 may also serve to display the status of the locking mechanism (e.g., deadbolt 118). Display body 126 may be operatively connected to thumbturn 102 such that thumbturn 102 may operate a mechanism within display body 126 for indicating the status of the locking mechanism of door lock 200. For example, thumbturn 102 may be operatively connected to the functional components of display body 126 via a connecting rod 128 (as shown in FIG. 4). To that end, display body 126 may include a cover plate 122 with an indicator window 124. The status of the locking mechanism of door lock 200 may be displayed within indicator window 124, via for example an indicator wheel 120, as shown in FIG. 5B. Specifically, a portion of indicator wheel 120 may be visible through indicator window 124, depending on the orientation of indicator wheel 120. In turn, corresponding portions of indicator wheel 120 may include one or more indications associated with one or more lock statuses. For example, indicator wheel 120 may include a first indication denoting that the locking mechanism is locked and a second indication that the locking mechanism is unlocked. The first and second indications may take on a number of forms, such as a series of colors (e.g., red for locked and green for unlocked), a series of words (e.g., "open," "unlocked," "closed," "locked," etc.), a surface texture gradient (e.g., a rough surface denoting one state as in locked and a smooth surface denoting another state as in unlocked), or any other suitable indication.

Figure 5A:
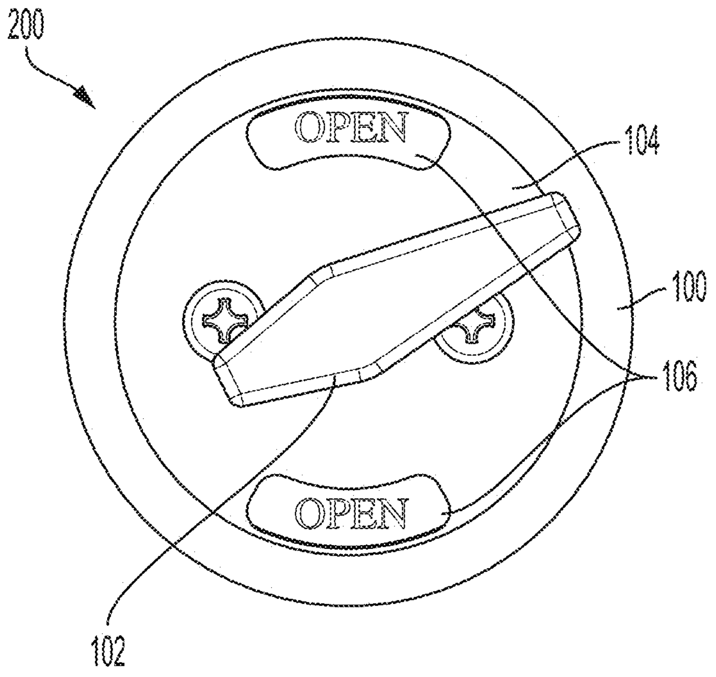
FIG. 5A is a front view of a reversible door lock with status indicator in an unlocked position according to one illustrative embodiment.
Figure 5B:
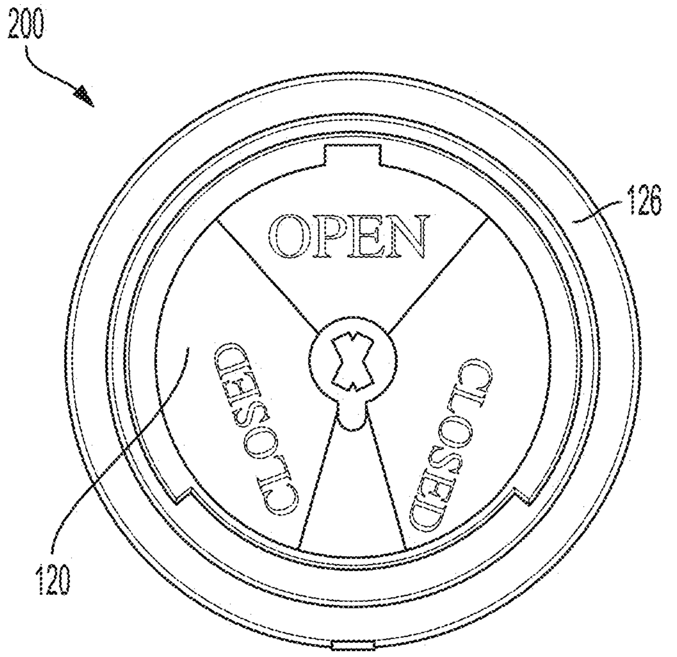
FIG. 5B is a rear view of a reversible door lock with status indicator in an unlocked position according to one illustrative embodiment.
Figure 6A:
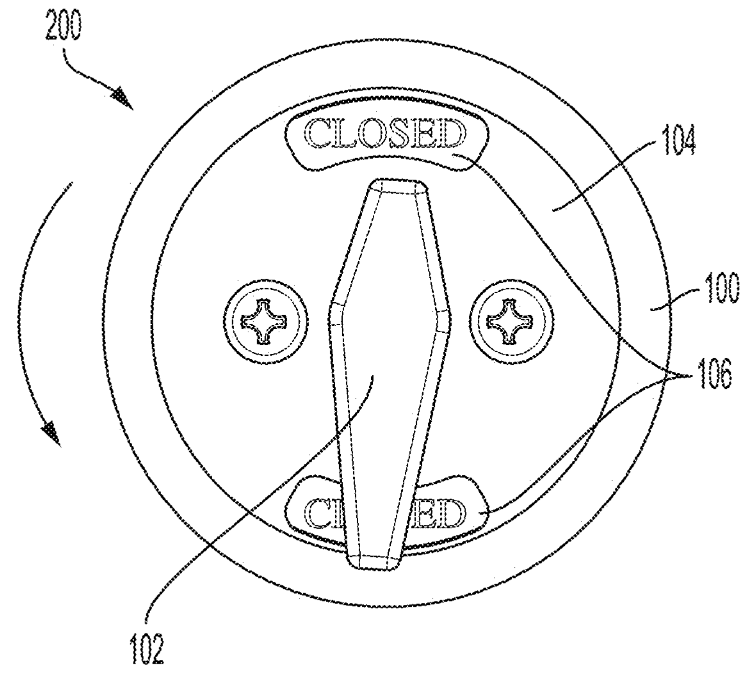
FIG. 6A is a front view of a reversible door lock with status indicator in a locked position according to one illustrative embodiment.
Figure 6B:
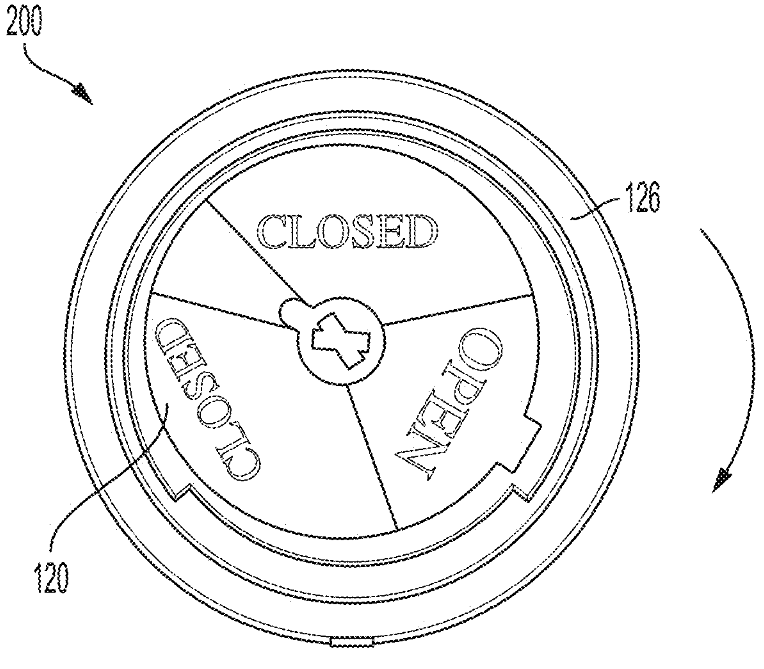
FIG. 6B is a rear view of a reversible door lock with status indicator in a locked position according to one illustrative embodiment.

FIGS. 5A-5B are front and rear elevation views of door lock 200. Particularly, from the front of door lock 200, lock body 100 is visible, while from the rear of door lock 200, display body 126 is visible. In FIG. 5B, display body 126 is shown with cover plate 122 removed, exposing indicator wheel 120. In some embodiments, door lock 200 may be reversible such that door lock 200 may be configured by the user to operate in a first orientation (e.g., a left-hand orientation) or a second orientation (e.g., a right-hand orientation). Specifically, in the first orientation, door lock 200 may transition from an unlocked state to a locked state when thumbturn 102 is turned to the left. Conversely, in the second orientation, door lock 200 may transition from an unlocked state to a locked state when thumbturn 102 is turned to the right. Accordingly, indicator wheel 120 may include a single "open" indication and two "closed" indications so that indicator wheel 120 may function regardless of whether door lock 200 is in the first or the second orientation. While FIGS. 5A-6B show door lock 200 operating in the first orientation, FIGS. 7A-8B show door lock 200 operating in a second orientation.

Turning to the first orientation (as shown in FIGS. 5A-6B), in some instances, the first orientation may be a left-hand orientation. In other words, thumbturn 102 may engage the locking mechanism (e.g., place the locking mechanism in a locked position) by turning to the left (e.g., counterclockwise). In turn, in such an orientation, thumbturn 102 may disengage the locking mechanism (e.g., place the locking mechanism in an unlocked position) by turning to the right (e.g., clockwise). Specifically, FIGS. 5A-5B show lock body 100 and display body 126 in an initial, unlocked position. In the initial, unlocked position, indicator wheel 120 as well as indicator windows 106 display an "open" indication denoting that the locking mechanism of door lock 200 is in an unlocked position. Thumbturn 102 may transition to a second, locked position by turning to the left (e.g., counterclockwise), locking the locking mechanism of door lock 200, as shown in FIG. 6A. In turn, status indicator ring 110 may turn counterclockwise along with thumbturn 102 behind escutcheon plate 104, making a closed indication visible through indicator windows 106. Relatedly, indicator wheel 120 may turn to the right (e.g., clockwise) as thumbturn 102 turns to the left, displaying a "closed" indication through indicator window 124 (not shown in FIG. 6B).

Figure 7A:
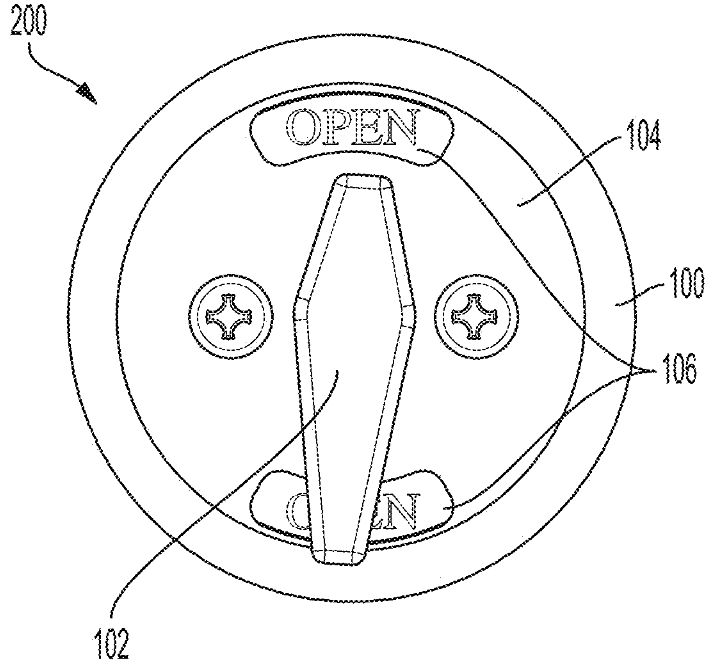
FIG. 7A is a front view of a reversible door lock with status indicator in an unlocked position according to one illustrative embodiment.
Figure 7B:
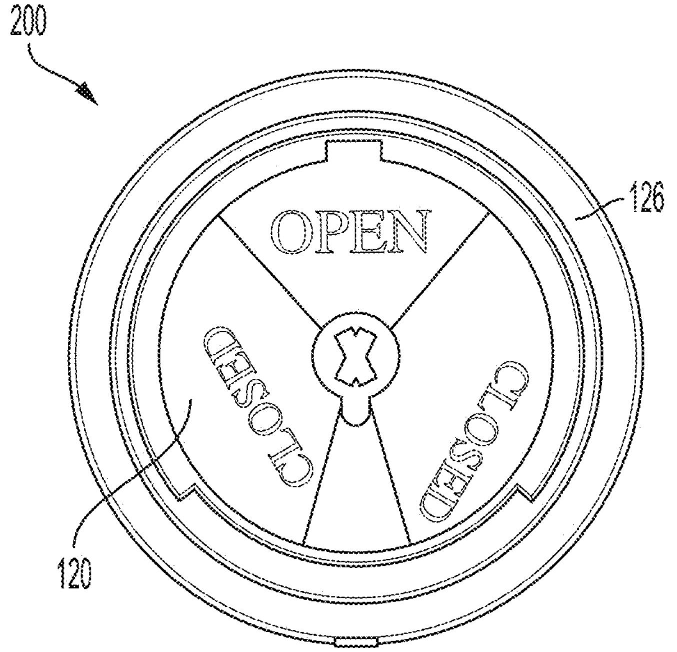
FIG. 7B is a rear view of a reversible door lock with status indicator in an unlocked position according to one illustrative embodiment.
Figure 8A:
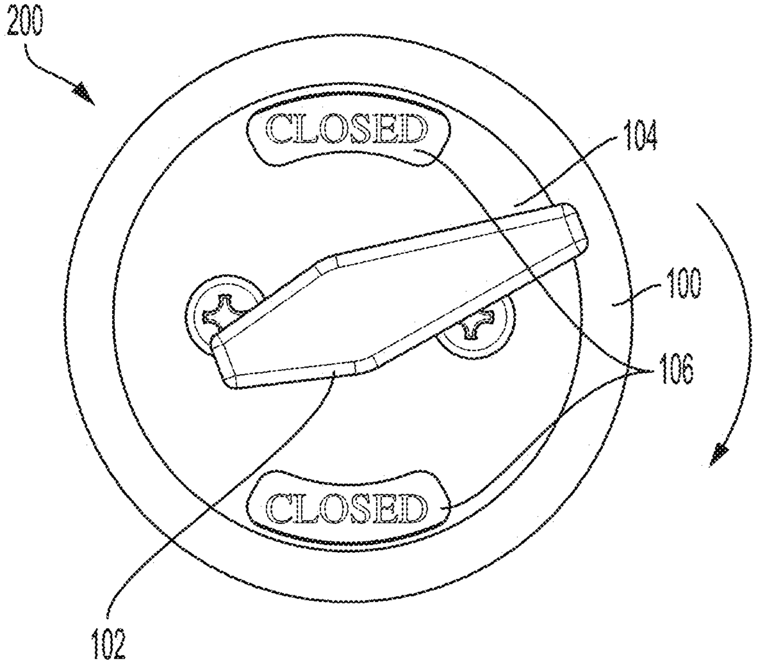
FIG. 8A is a front view of a reversible door lock with status indicator in a locked position according to one illustrative embodiment.
Figure 8B:
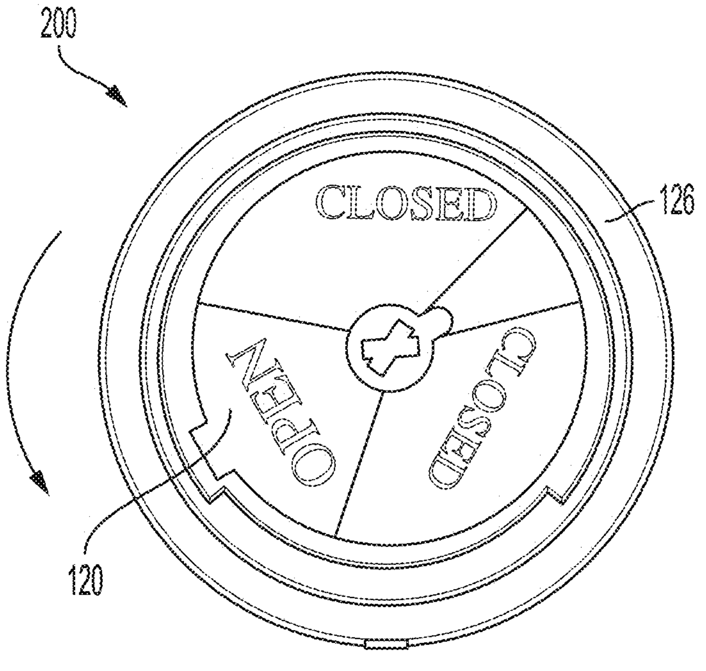
FIG. 8B is a rear view of a reversible door lock with status indicator in a locked position according to one illustrative embodiment.

Turning to the second orientation (as shown in FIGS. 7A-8B), in some instances, the second orientation may be a right-hand orientation. In other words, thumbturn 102 may engage the locking mechanism (e.g., place the locking mechanism in a locked position) by turning to the right (e.g., clockwise). In turn, in such an orientation, thumbturn 102 may disengage the locking mechanism (e.g., place the locking mechanism in an unlocked position) by turning to the left (e.g., counterclockwise). Specifically, FIGS. 7A-7B show lock body 100 and display body 126 in an initial, unlocked position. In the initial, unlocked position, indicator wheel 120 as well as indicator windows 106 display an "open" indication denoting that the locking mechanism of door lock 200 is in an unlocked position. Thumbturn 102 may transition to a second, locked position by turning to the right (e.g., clockwise), locking the locking mechanism of door lock 200, as shown in FIG. 8A. In turn, status indicator ring 110 may turn clockwise along with thumbturn 102 behind escutcheon plate 104, making a closed indication visible through indicator windows 106. Relatedly, indicator wheel 120 may turn to the left (e.g., counterclockwise) as thumbturn 102 turns to the right, displaying a "closed" indication through indicator window 124 (not shown in FIG. 8B).

Figure 9A:
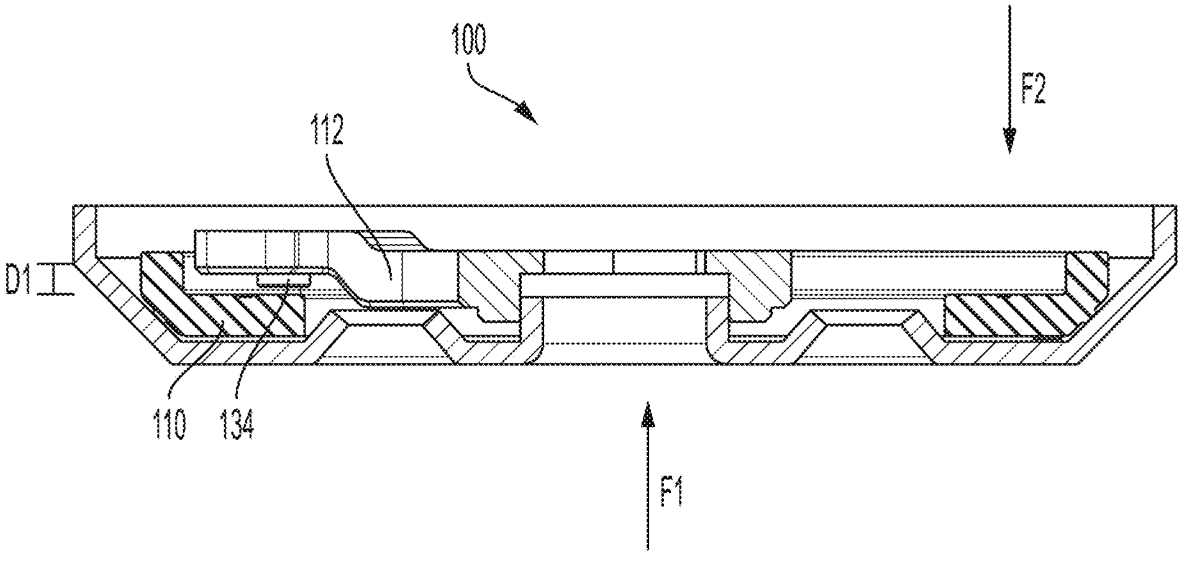
FIG. 9A is a cross sectional view of a reversible door lock with status indicator according to one illustrative embodiment.
Figure 9B:
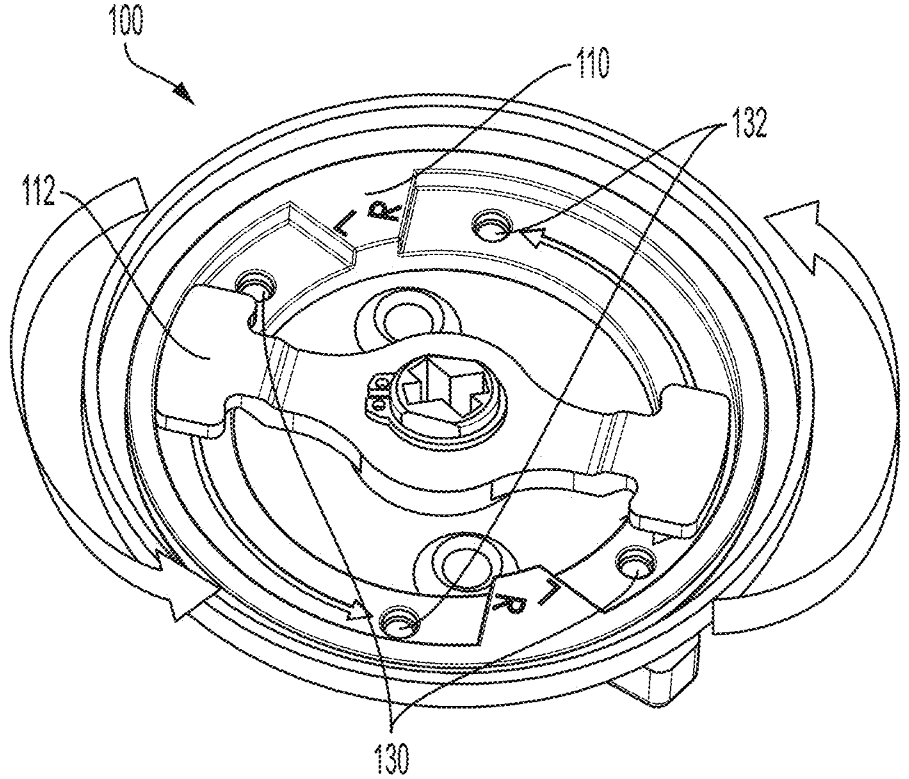
FIG. 9B is a top perspective view of a reversible door lock with status indicator according to one illustrative embodiment.
Figure 10A:
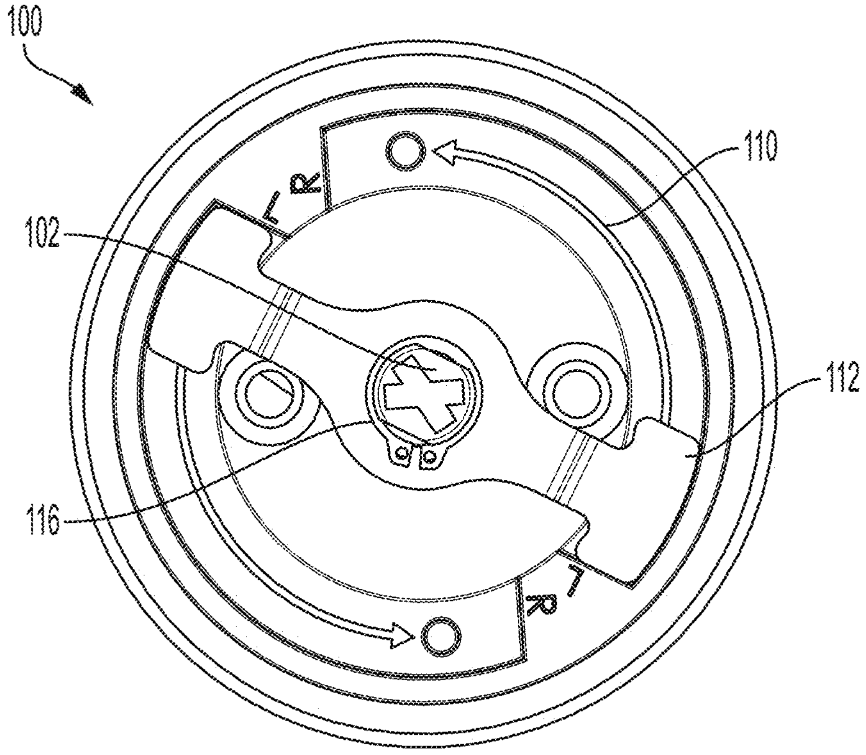
FIG. 10A is a rear view of a reversible door lock with status indicator with a drive wheel in a first fixed position according to one illustrative embodiment.
Figure 10B:
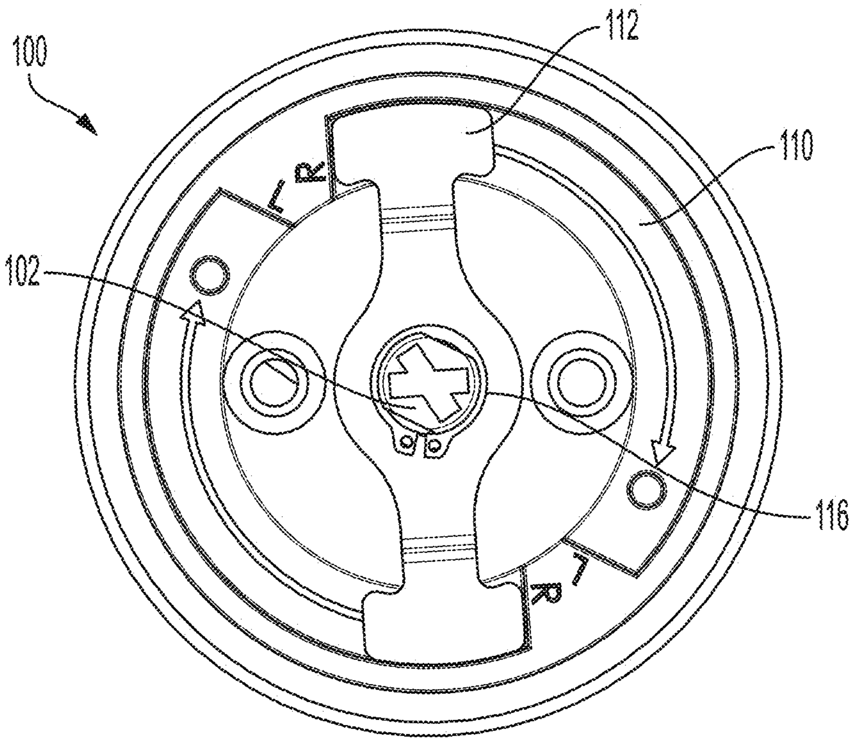
FIG. 10B is a rear view of a reversible door lock with status indicator with a drive wheel in a second fixed position according to one illustrative embodiment; and, FIG. 11 is a flowchart detailing the steps of a method of reversing the direction of a reversible door lock with status indicator according to one illustrative embodiment.

A user may be able to modify the locking mechanism as needed to adjust the orientation of the locking mechanism of door lock 200, for example, as shown in FIGS. 9A-10B, depending upon whether the door lock is configured for a right handed door or a left handed door. In some instances, the orientation of door lock 200 may only be modified when door lock 200 is disassembled and cover plate 108 is removed, as described above. Specifically, drive wheel 112 may be capable of transitioning from a first fixed position to a second fixed position to alter the orientation of door lock 200. For example, as shown in FIGS. 9A-9B, drive wheel 112 may include one or more pins 134 shaped to fit within either a first set of grooves 130 or a second set of grooves 132. Accordingly, drive wheel 112 may be said to be in a first fixed position when pins 134 are fit within first set of grooves 130, and drive wheel 112 may be said to be in a second fixed position when pins 134 fit within second set of grooves 132. In the embodiment shown, door lock 200 is oriented in a left-hand orientation when pins 134 are fit within first set of pins 130 (e.g., the embodiment of FIG. 10A), and door lock 200 is oriented in a right-hand orientation when pins 134 are fit within second set of grooves 132 (e.g., the embodiment of FIG. 10B).

To move drive wheel 112 from the first fixed position to the second fixed position, pins 134 may first need to be removed from first set of grooves 130. This can be achieved by a user applying a first force F1 on thumbturn 102 towards status indicator ring 110 and a second force F2 on status indicator ring towards thumbturn 102 (as described above, this may serve to overcome the biasing force of biasing spring 114). Because thumbturn 102 is operatively coupled to drive wheel 112 as described above, forces F1, F2 may allow drive wheel 112 to be displaced a first distance D1 away from status indicator ring sufficient to allow drive wheel 112 to decouple from status indicator ring 110 such that drive wheel 112 may move without also moving status indicator ring 110. Accordingly, a user may then align pins 134 with second set of grooves 132 and release forces F1, F2 to allow pins 134 to fit within second set of groves 132 (e.g., via the biasing force of biasing spring 114). A user may follow the same process to move drive wheel 112 from the second fixed position to the first fixed position.

As will be appreciated by one of skill in the art, thumbturn 102 may move a second distance as drive wheel 112 move first distance D1 away from status indicator ring 110. In some instances, the second distance equals first distance D1. Of course, the second distance may take on any suitable value, depending on the application.

Lock body 100 may be constructed and arranged to have a first distance D1 of any suitable value. For example, in various embodiments, first distance D1 may be 0.4 mm or at least 0.4 mm, 0.6 mm or at least 0.6 mm, 0.8 mm or at least 0.8 mm, or any other suitable value. Further, in various embodiments, first distance D1 may be less than 1.4 mm, less than 1.2 mm, less than 1 mm, or any other suitable value. Combinations of the above referenced ranges are also contemplated. For example, first distance D1 may be between 0.4 mm and 1.4 mm inclusive, between 0.6 mm and 1.2 mm inclusive, or between 0.8 mm and 1 mm inclusive. First distance D1 may take on other suitable values or ranges, depending on the application.

As will be appreciated by one of skill in the art, and as described above, drive wheel 112 may be prevented from moving first distance D1 by cover plate 108 (shown in FIG. 1B) when lock body 100 is fully assembled. Thus, in some instances, drive wheel 112 may only be free to transition between orientations when cover plate 108 is not attached to lock body 100. Once door lock 200 is installed on a door, a user may need remove door lock 200 from the door to disassemble door lock 200 before altering the orientation of door lock 200.

Figure 11:
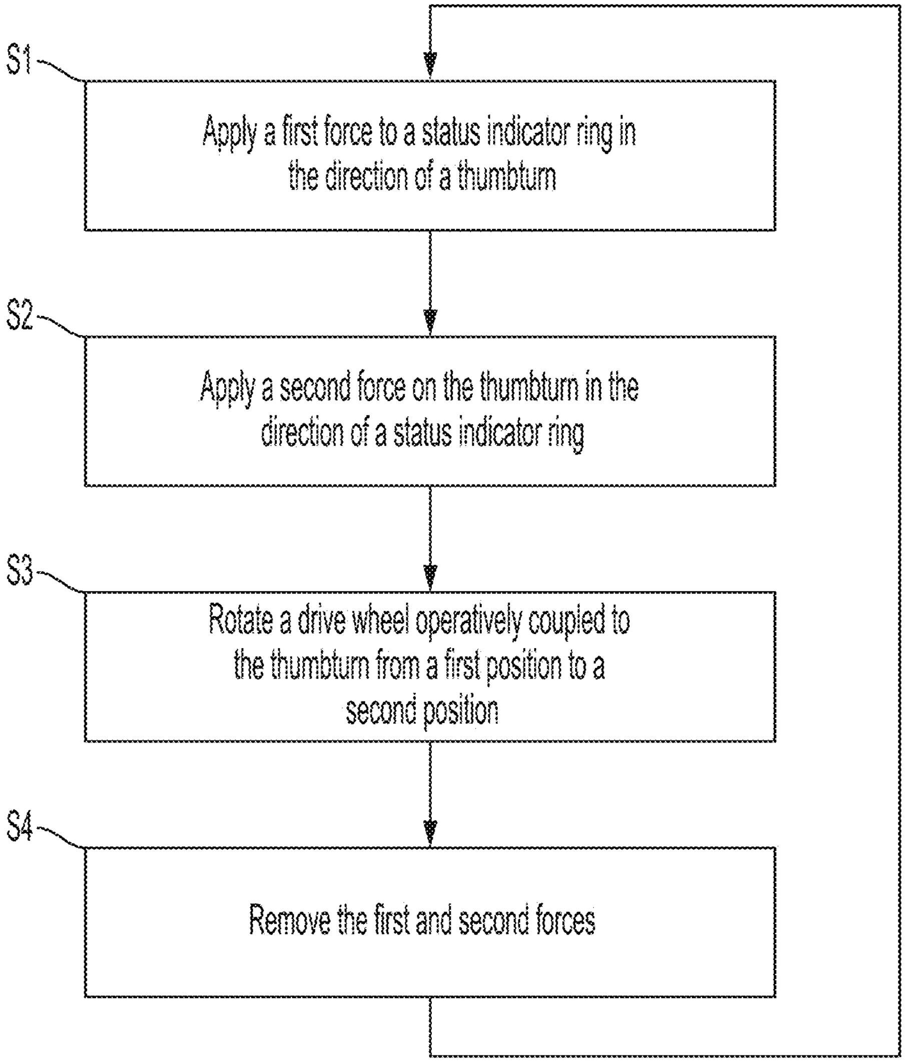

The present disclosure may also be embodied as a method of reversing the orientation of door lock 200. For example, FIG. 11 is a flowchart outlining the method steps for transitioning door lock 200 from a first orientation to a second orientation. At step S1, a user may apply a first force (e.g., force F2) to status indicator ring 110 in a direction of thumbturn 102. Then, at step S2, the user may apply a second force (e.g., force F1) to thumbturn 102 in the direction of status indicator ring 110, overcoming the biasing force of biasing spring 114 and displacing drive wheel 112 away from status indicator ring 110 by at least first distance D1. At step S3, the user may then rotate drive wheel 112 from a first position (e.g., the first fixed orientation) to a second position (e.g., the second fixed orientation) via the thumbturn 102. At step S4, the user may then remove the first and second forces, for example by releasing status indicator ring 110 and thumbturn 102, allowing biasing spring 114 to retain drive wheel 112 in the second position.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A door lock comprising:

an escutcheon plate having one or more indicator windows disposed through a portion of the escutcheon plate;

a status indicator ring, at least a portion of which is visible through the one or more indicator windows, having a first indication denoting a locked position of the door lock and a second indication denoting an unlocked position of the door lock;

a drive wheel operatively coupled to the status indicator ring such that the status indicator ring turns as the drive wheel turns;

a thumbturn operatively coupled to the drive wheel to turn the drive wheel and configured to disengage the drive wheel from the status indicator ring;

a spring configured to bias the thumbturn away from the status indicator ring, maintaining the coupling of the status indicator ring with the drive wheel;

wherein the drive wheel is configured to transition between a first fixed state and a second fixed state wherein, in the first fixed state, the door lock operates in a right-handed direction, and wherein, in the second fixed state, the door lock operates in a left-handed direction; and wherein, to transition the drive wheel between the first and second fixed states, the thumbturn is configured to move toward the status indicator ring, such that the thumbturn disengages the status indicator ring from the drive wheel and allows movement from one fixed state to another.

2. The door lock of claim 1, wherein the drive wheel is movable between the first fixed state and the second fixed state when the drive wheel is moved a first distance away from the status indicator ring.

3. The door lock of claim 2, further comprising a cover shield, wherein the cover shield is configured to cover the drive wheel and status indicator ring.

4. The door lock of claim 3, wherein the cover shield prevents the drive wheel from moving the first distance away from the status indicator ring.

5. The door lock of claim 1, further comprising a connecting rod configured to operatively couple the thumbturn to the drive wheel.

6. The door lock of claim 1, further including a display body operatively coupled to the thumbturn, wherein the thumbturn is disposed on a first side of a door and the display body is disposed on a second side of the door opposite to the first side of the door.

7. The door lock of claim 6, wherein a connecting rod operatively couples the thumbturn to the display body.

8. The door lock of claim 6, wherein the display body includes a cover plate having a second indicator window disposed through a portion of the cover plate.

9. The door lock of claim 8, wherein the display body includes an indicator wheel, at least a portion of which is visible through the second indicator window, wherein the indicator wheel has a first indication denoting a locked position and a second indication denoting an unlocked position.

10. The door lock of claim 1, wherein the thumbturn is configured to lock the door lock by turning in a first direction and is configured to unlock the door lock by turning in a second direction opposite to the first direction when the drive wheel is in the first fixed position.

11. The door lock of claim 10, wherein the thumbturn is configured to lock the door lock by turning in the second direction and is configured to unlock the door lock by turning in the first direction when the drive wheel is in the second fixed position.

12. A lock body for a door lock, the lock body comprising:

an escutcheon plate having one or more indicator windows disposed through a portion of the escutcheon plate;

a status indicator ring, at least a portion of which is visible through the one or more indicator windows, having a first indication denoting a locked position of the door lock when the lock body is installed on the door lock and a second indication denoting an unlocked position of the door lock when the lock body is installed on the door lock;

a drive wheel operatively coupled to the status indicator ring such that the status indicator ring turns as the drive wheel turns;

a thumbturn operatively coupled to the drive wheel to turn the drive wheel and configured to disengage the drive wheel from the status indicator ring;

a spring configured to bias the thumbturn away from the status indicator ring, maintaining the coupling of the status indicator ring with the drive wheel;

wherein the drive wheel is configured to transition between a first fixed state and a second fixed state wherein, in the first fixed state, the lock body is configured to cooperate with the door lock operating in a right-handed direction, and wherein, in the second fixed state, the lock body is configured to cooperate with the door lock operating in a left-handed direction; and wherein, to transition the drive wheel between the first and second fixed states, the thumbturn is configured to move toward the status indicator ring, such that the thumbturn disengages the status indicator ring from the drive wheel, and allows movement from one fixed state to another.

13. The lock body of claim 12, wherein the drive wheel is movable between the first fixed state and the second fixed state when the drive wheel is moved a first distance away from the status indicator ring.

14. The lock body of claim 13, further comprising a cover shield, wherein the cover shield is configured to cover the drive wheel and status indicator ring.

15. The lock body of claim 14, wherein the cover shield prevents the drive wheel from moving the first distance away from the status indicator ring.

* * * * *